United States Patent
Zhou (10) Patent No.: US 9,178,786 B2
(45) Date of Patent: Nov. 3, 2015

(54) PACKET LOSS DETECTION METHOD AND SYSTEM, SENDING DEVICE, AND RECEIVING DEVICE

(71) Applicant: HUAWEI TECHNOLOGIES CO., LTD., Shenzhen (CN)

(72) Inventor: Peng Zhou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 84 days.

(21) Appl. No.: 14/255,307

(22) Filed: Apr. 17, 2014

(65) Prior Publication Data

US 2014/0226514 A1    Aug. 14, 2014

Related U.S. Application Data

(63) Continuation of application No. PCT/CN2012/078145, filed on Jul. 4, 2012.

(30) Foreign Application Priority Data

Oct. 27, 2011    (CN) .......................... 2011 1 0331932

(51) Int. Cl.
*H04L 12/28*    (2006.01)
*H04L 12/26*    (2006.01)
(Continued)

(52) U.S. Cl.
CPC ........ *H04L 43/0829* (2013.01); *H04L 43/0835* (2013.01); *H04L 45/68* (2013.01); *H04L 47/62* (2013.01); *H04L 12/4641* (2013.01); *H04L 47/34* (2013.01)

(58) Field of Classification Search
CPC .......... H04L 12/28; H04L 47/22; H04L 45/74
See application file for complete search history.

(56) References Cited

U.S. PATENT DOCUMENTS 6,188,674 B1    2/2001    Chen et al.
6,853,619 B1    2/2005    Grenot
(Continued)

FOREIGN PATENT DOCUMENTS

CN    101605020    12/2009
CN    101699786    4/2010
(Continued)

OTHER PUBLICATIONS

International Search Report mailed Oct. 18, 2012, in corresponding International Application No. PCT/CN2012/078145.
(Continued)

*Primary Examiner* — Andrew Lee
(74) *Attorney, Agent, or Firm* — Staas & Halsey LLP (57) ABSTRACT

A packet loss detection method includes: a receiving end receives a service packet whose color belongs to a first color spectrum; counts the number of the service packets whose color belongs to the first color spectrum; after receiving a detection packet, continues counting the number of the service packets whose color belongs to the first color spectrum, where the detection packet carries the number of service packets whose color belongs to the first color spectrum and that are sent by a sending end; when a preset condition is satisfied, the receiving end stops counting the number of the service packets whose color belongs to the first color spectrum, where the number of the service packets counted by the receiving end and the number of the service packets sent by the sending end carried in the detection packet are used for calculating the number of lost packets.

8 Claims, 10 Drawing Sheets

(51) Int. Cl.
*H04L 12/721* (2013.01)
*H04L 12/863* (2013.01)
H04L 12/46 (2006.01)
H04L 12/801 (2013.01)

(56) References Cited

U.S. PATENT DOCUMENTS

| | | |
|---|---|---|
| 2005/0169182 A1 | 8/2005 | Klink |
| 2006/0215711 A1* | 9/2006 | Mori ............... H04L 29/06027 370/542 |
| 2006/0256803 A1* | 11/2006 | Nakata ................ H04L 1/1887 370/412 |
| 2007/0064611 A1 | 3/2007 | He |
| 2009/0064248 A1* | 3/2009 | Kwan ............... H04L 12/1868 725/109 |
| 2010/0008250 A1 | 1/2010 | Nomura et al. |
| 2010/0302949 A1 | 12/2010 | Fukagawa |
| 2011/0141964 A1* | 6/2011 | Ai ......................... H04L 41/044 370/312 |
| 2011/0255440 A1 | 10/2011 | Cociglio et al. |
| 2012/0026869 A1 | 2/2012 | Wang et al. |
| 2012/0144415 A1* | 6/2012 | Velusamy ............. H04H 60/32 725/14 |
| 2012/0269086 A1 | 10/2012 | Yue et al. |
| 2013/0215774 A1* | 8/2013 | Bender ............... H04L 65/1083 370/252 |
| 2013/0301416 A1* | 11/2013 | Racz ................ H04W 28/0268 370/235 |
| 2013/0322255 A1* | 12/2013 | Dillon .................... H04L 47/22 370/236 |
| 2014/0362850 A1* | 12/2014 | Wakely ............... H04M 7/0066 370/352 |
| 2015/0035724 A1* | 2/2015 | Spracklen ........... H04L 43/0829 345/2.2 |
| 2015/0207710 A1* | 7/2015 | Dickins ................. H04L 65/80 370/252 |

FOREIGN PATENT DOCUMENTS

| | | |
|---|---|---|
| CN | 101729304 | 6/2010 |
| CN | 101741739 | 6/2010 |
| CN | 101800679 | 8/2010 |
| CN | 101854268 | 10/2010 |
| CN | 102025571 | 4/2011 |
| CN | 102118277 | 7/2011 |
| CN | 102158371 | 8/2011 |
| CN | 102404166 | 4/2012 |
| EP | 1 659 743 A1 | 5/2004 |
| JP | 2002-538666 | 11/2002 |
| WO | 2008/116482 | 10/2008 |
| WO | 2009/098757 A1 | 8/2009 |

OTHER PUBLICATIONS

Japanese Office Action dated Jun. 16, 2015 in corresponding Japanese Patent Application No. 2014-537461.
Chinese Office Action dated Jul. 24, 2014 in corresponding Chinese Patent Application No. 201110331932.0.
PCT International Search Report and Written Opinion of the International Searching Authority dated Oct. 18, 2012 in corresponding International Patent Application No. PCT/CN2012/078145.
"Traffic priority—IEEE 802.1p", Baldi et al., Maggio 2004, pp. 1-13.
"IEEE Standard for Local and metropolitan area networks—Virtual Bridged Local Area Networks, Amendment 5: Connectivity Fault Management", IEEE Computer Society, Dec. 2007, 260 pp.
"Series Y: Global Information Infrastructure, Internet Protocol Aspects and Next-Generation Networks, Internet protocol aspects—Operation, administration and maintenance, OAM functions and mechanisms for Ethernet based networks", Telecommunication Standardization Sector of ITU, Y.1731, Feb. 2008, 82 pp.
"IEEE Standard for Local and metropolitan area networks—Virtual Bridged Local Area Networks, Amendment 7: Provider Backbone Bridges"; LAN/MAN Standards Committee of the IEEE Computer Society, Jun. 2008, 110 pp.
"ITU-T Y.1731 Performance Monitoring in a Service Provider Network", Cisco, Mar. 2011, pp. 1-10.
"Multi-Service IronWare Administration Guide, Supporting Multi-Service IronWare R05.6.00", Brocade, Dec. 2013, 432 pp.
Chinese Office Action dated Aug. 4, 2014 in corresponding Chinese Patent Application No. 201110331932.0.
Extended and Supplementary European Search Report issued on Oct. 23, 2014 in corresponding European Patent Application No. 12843196.2.

* cited by examiner

PACKET LOSS DETECTION METHOD AND SYSTEM, SENDING DEVICE, AND RECEIVING DEVICE

CROSS-REFERENCE TO RELATED APPLICATIONS

This application is a continuation of International Application No. PCT/CN2012/078145, filed on Jul. 4, 2012, which claims priority to Chinese Patent Application No. 201110331932.0, filed on Oct. 27, 2011, both of which are hereby incorporated by reference in their entireties.

TECHNICAL FIELD

Embodiments of the present application relate to network communications technologies, and in particular, to a packet loss detection method and system, a sending device and a receiving device.

BACKGROUND

In an Internet protocol (hereinafter referred to as IP) bearer network, packet loss is one of important measurement indexes for quality of service (Quality of Service, hereinafter referred to as QoS).

Packet loss detection may be performed in various manners, where an existing packet loss detection manner is detection based on the counting of service packets. In a method of detection based on the counting of service packets, the number of lost packets may be calculated according to the number of service packets that are received by a receiving end before the receiving end receives a detection packet. For example, within one counting period, a sending end sends four service packets, and then sends one detection packet. For the receiving end, the counted number of received packets is the number of the service packets before the detection packet is received. If three service packets are received before the detection packet is received, the number of lost packets is 4−3=1.

However, when a packet transmitting path is a load sharing multipath, or QoS scheduling exists in a packet transmitting device, a disorder may occur, that is, a sending end sends packets in order, but this order changes when the packets reach a receiving end. For example, the foregoing sending end first sends a service packet and then sends a detection packet; while at the receiving end, a case that first the detection packet is received and then the service packet is received may occur, which causes that during calculation of the number of lost packets, a service packet received after a detection packet is not counted, so that the calculated number of lost packets is inaccurate.

SUMMARY

The present application provides a packet loss detection method and system, a sending device and a receiving device, so as to improve the accuracy of packet loss detection.

In one aspect, the present application provides a packet loss detection method, including:

receiving, by a receiving end, a service packet whose color belongs to a first color spectrum;

counting, by the receiving end, the number of the service packets whose color belongs to the first color spectrum;

after receiving a detection packet, continuing, by the receiving end, counting the number of the service packets whose color belongs to the first color spectrum, where the detection packet carries the number of service packets whose color belongs to the first color spectrum and that are sent by a sending end;

when a preset condition is satisfied, stopping, by the receiving end, counting the number of the service packets whose color belongs to the first color spectrum, where the number of the service packets whose color belongs to the first color spectrum counted by the receiving end and the number of the service packets whose color belongs to the first color spectrum and that are sent by the sending end carried in the detection packet are used for calculating the number of lost packets; and calculating, by the receiving end, according to the counted number of the service packets whose color belongs to the first color spectrum and the number of the service packets whose color belongs to the first color spectrum and that are sent by the sending end carried in the detection packet, the number of lost packets for the service packets whose color belongs to the first color spectrum.

In another aspect, the present application provides a packet loss detection method, including:

sending, by a sending end, a service packet, where the service packet carries information indicating a color, colors of service packets sent within a same sending detection period belong to a same color spectrum, and color spectrums of service packets sent within adjacent sending detection periods have no intersection; and according to a sending detection period, inserting, by the sending end, a detection packet between service packets and sending the detection packet, where the detection packet carries the number of sent packets.

In still another aspect, the present application provides a receiving device, including:

a receiver (81), configured to receive packets, which include a service packet whose color belongs to a first color spectrum and a detection packet;

a counting module (82), configured to count the number of the service packets whose color belongs to the first color spectrum and that are received by the receiver (81), and when a preset condition is satisfied, stop counting the number of the service packets whose color belongs to the first color spectrum, where the detection packet carries the number of service packets whose color belongs to the first color spectrum and that are sent by a sending end; and a calculation module (83), configured to calculate, according to the number of the service packets whose color belongs to the first color spectrum counted by the counting module and the number of the service packets whose color belongs to the first color spectrum and that are sent by the sending end carried in the detection packet, the number of lost packets for the service packets whose color belongs to the first color spectrum.

In another aspect, the present application provides a sending device, including:

a sender (91), configured to send a service packet, where the service packet carries information indicating a color, colors of service packets sent within a same sending detection period belong to a same color spectrum, and color spectrums of service packets sent within adjacent sending detection periods have no intersection; and an inserting module (92), configured to insert a detection packet between service packets according to a sending detection period, where the detection packet carries the number of sent packets.

The sender (91) is further configured to send the detection packet.

In still another aspect, the present application provides a packet loss detection system, including: the foregoing receiving device and sending device.

It can be known from the foregoing technical solutions that, in the embodiments of the present application, the number of lost packets is not calculated after a detection packet is received and according to the number of service packets received before the detection packet, and instead, a certain condition is preset, and before the preset condition is satisfied, the number of received service packets continues to be counted. Therefore, during calculation of the number of lost packets, as many service packets as possible sent by a sending end within one sending detection period are taken into consideration, and the calculated number of lost packets is also more accurate.

BRIEF DESCRIPTION OF DRAWINGS

To describe the technical solutions in the embodiments of the present application more clearly, the following briefly introduces the accompanying drawings required for describing the embodiments. Apparently, the accompanying drawings in the following description show some embodiments of the present application, and persons of ordinary skill in the art may still derive other drawings from these accompanying drawings without creative efforts.

DESCRIPTION OF EMBODIMENTS

To make the objectives, technical solutions, and advantages of the embodiments of the present application more comprehensible, the following clearly describes the technical solutions in the embodiments of the present application with reference to the accompanying drawings in the embodiments of the present application. Apparently, the embodiments to be described are merely a part rather than all of the embodiments of the present application. All other embodiments obtained by persons of ordinary skill in the art based on the embodiments of the present application without creative efforts shall fall within the protection scope of the present application.

For ease of description, the following terms are defined in the embodiments of the present application:

Sending detection period: A period that a sending end inserts a detection packet is referred to as a sending detection period, which is a time difference of insertion of two adjacent detection packets.

Color of packet: It is information used for identifying a packet, such as, an experiment (Experiment, hereinafter referred to as EXP) field of an entropy label (entropy label) in a packet, a virtual local area network identifier (Virtual Local Area Network Identifier, hereinafter referred to as VLAN ID), 802.1P or a sequence number of a pseudo wire (Pseudo Wire, hereinafter referred to as PW) control word. According to an actual requirement, at least one may be selected as information for identifying a packet. If information used for identifying packets is the same, colors of the packets are the same.

Color spectrum: A set of colors of a certain type of packets is referred to as a color spectrum of the type of packets. For example, a set of colors of packets belonging to a same sending detection period is referred to as a color spectrum of the packets of the sending detection period, or may be referred to as a color spectrum of the sending detection period. Color spectrums of any two adjacent sending detection periods have no intersection. For example, the color spectrums of two adjacent sending detection periods are Color Spectrum 1 and Color Spectrum 2, and that Color Spectrum 1 and Color Spectrum 2 have no intersection means that: Color Spectrum 1 does not have any color in Color Spectrum 2, and Color Spectrum 2 does not have any color in Color Spectrum 1.

Receiving detection period: It corresponds to the sending detection period, and in an optimal situation, a receiving detection period is the same as a corresponding sending detection period. However, a disorder may occur during packet transmission. Packets sent by a sending end within one sending detection period, when reaching a receiving end, are not necessarily within a same receiving detection period. However, generally, most of packets within one receiving detection period belong to one sending detection period. A color spectrum of the receiving detection period is a color spectrum of the corresponding sending detection period.

Embodiments of the present application are applicable to the following scenarios. For example, FIG. 1 is a schematic diagram of system networking of an application scenario according to an embodiment of the present application, and FIG. 2 is a schematic diagram of system networking of another application scenario according to an embodiment of the present application.

Figure 1:
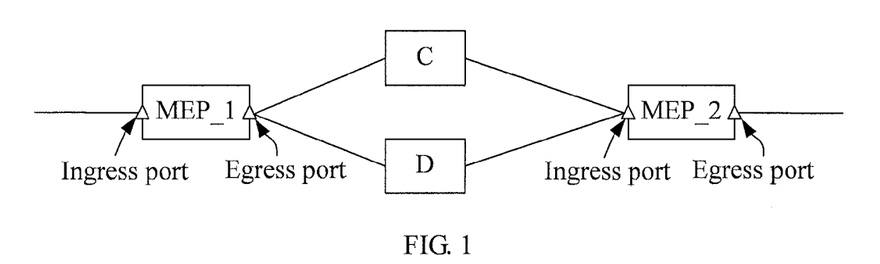
FIG. 1 is a schematic diagram of system networking of an application scenario according to an embodiment of the present application.

FIG. 1 is a schematic diagram of a multipath load sharing scenario. Referring to FIG. 1, maintenance end point (Maintenance End Point, hereinafter referred to as MEP)_1 and MEP_2 are a starting device of packet loss detection and an ending device of packet loss detection, respectively, which are referred to as a sending device (or a sending end) and a receiving device (or a receiving end) in subsequent embodiments, respectively, and C and D are two intermediate devices. The system includes two paths: MEP_1-C-MEP_2 and MEP_1-D-MEP_2. Definitely, the embodiments of the present application are also applicable to a scenario with more paths. In this scenario, a packet is transmitted from an ingress port of MEP_1 to an egress port of MEP_1, passes through device C or device D, reaches an ingress port of MEP_2, and is output from an egress port of MEP_2.

In the embodiment of the present application, a starting point and an ending point of detection may be set according to an actual requirement. For example, it may be set that the starting point of detection is the ingress port of MEP_1 and the ending point is the egress port of MEP_2, and the number of sent packets that is counted by the sending device (that is, MEP_1) is the number of packets sent at the ingress port of MEP_1, and the number of received packets that is counted by the receiving device (that is, MEP_2) is the number of packets received at the egress port of MEP_2.

Figure 2:
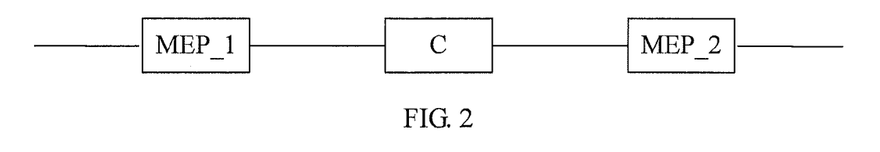
FIG. 2 is a schematic diagram of system networking of another application scenario according to an embodiment of the present application.

FIG. 2 is a scenario of QoS scheduling. Referring to FIG. 2, a detection range includes MEP_1, C, and MEP_2, and QoS scheduling may occur on at least one of devices: MEP_1, C, and MEP_2. In FIG. 2, an intermediate device is taken as an example, and multiple intermediate devices may also be included.

Definitely, the embodiment of the present application is also applicable to a combination of the foregoing two scenarios, that is: including scenarios of both multipath load sharing and QoS scheduling. Alternatively, the embodiment of the present application is applicable to another scenario, or even is applicable to a scenario where no disorder exists.

Figure 3A:
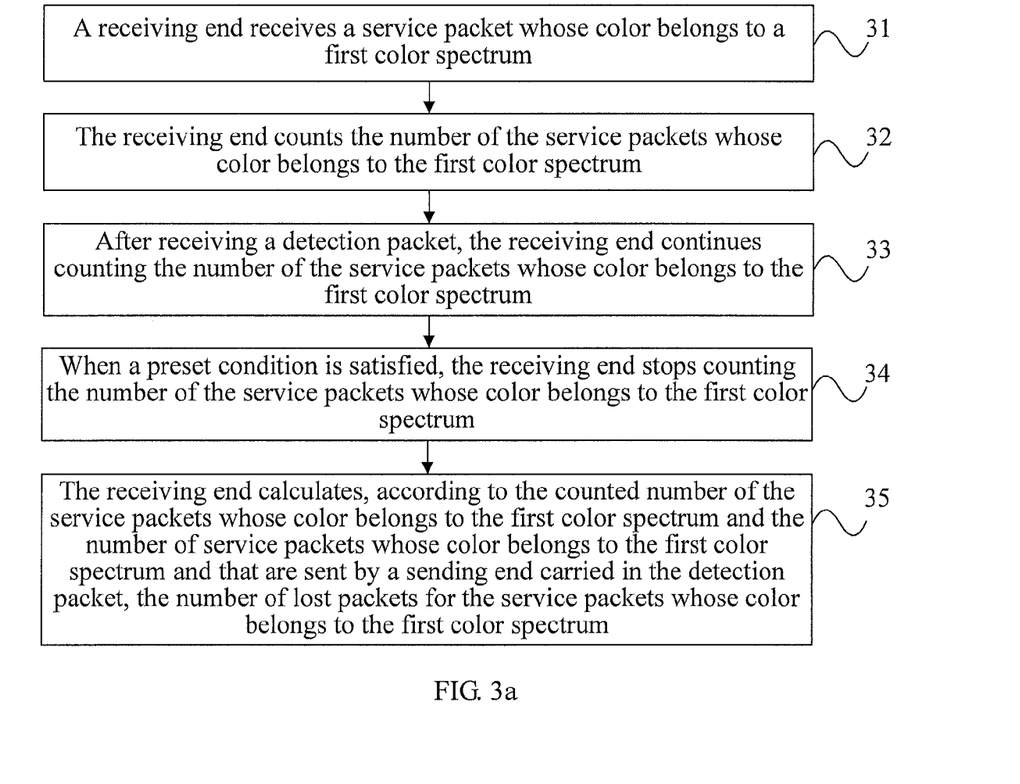
FIG. 3a is a schematic flow chart of a method according to an embodiment of the present application.

FIG. 3a is a schematic flow chart of a method according to an embodiment of the present application, where the method includes:

31: A receiving end receives a service packet whose color belongs to a first color spectrum.

For example, in the scenario shown in FIG. 1 or FIG. 2, MEP_2 receives a service packet, and counts service packets by color.

In addition, in the embodiment of the present application, the naming of a service packet is to distinguish a detection packet from the service packet, which generally refers to a packet of any service in a network, such as a packet of a data service and a packet of a voice service.

32: The receiving end counts the number of the service packets whose color belongs to the first color spectrum.

33: After receiving a detection packet, the receiving end continues counting the number of the service packets whose color belongs to the first color spectrum, where the detection packet carries the number of service packets whose color belongs to the first color spectrum and that are sent by a sending end.

34: When a preset condition is satisfied, the receiving end stops counting the number of the service packets whose color belongs to the first color spectrum.

35: The receiving end calculates, according to the counted number of the service packets whose color belongs to the first color spectrum, and the number of the service packets whose color belongs to the first color spectrum and that are sent by the sending end carried in the detection packet, the number of lost packets for the service packets whose color belongs to the first color spectrum.

Figure 3B:
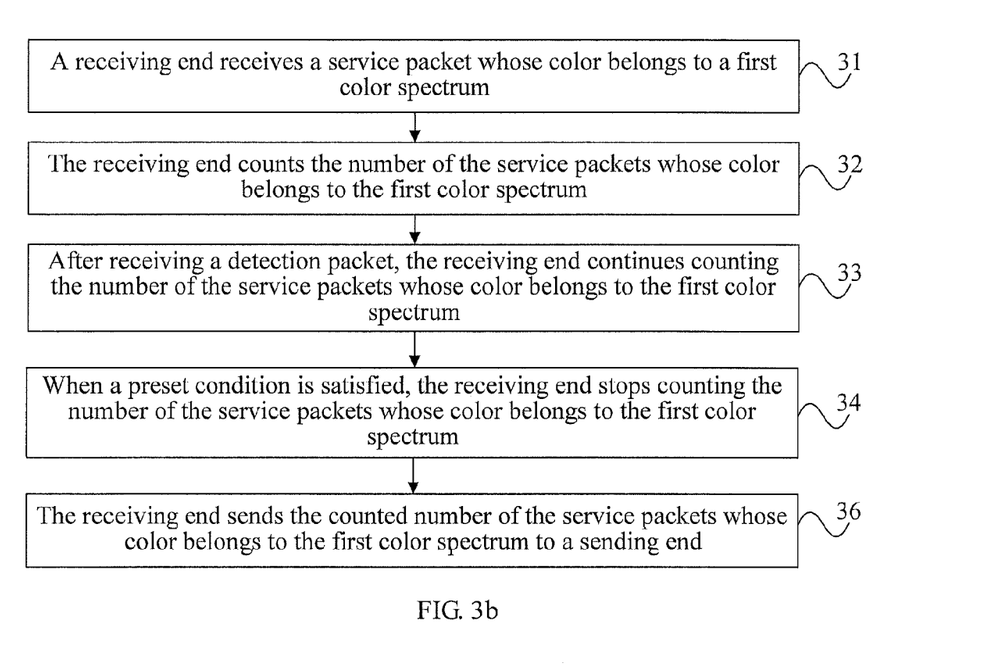
FIG. 3b is a schematic flow chart of a method according to another embodiment of the present application.

Optionally, as shown in FIG. 3b, after 34, this embodiment may further include:

36: The receiving end sends the counted number of the service packets whose color belongs to the first color spectrum to the sending end, so that the sending end calculates, according to the counted number of the service packets whose color belongs to the first color spectrum and the number of the service packets whose color belongs to the first color spectrum and that are sent by the sending end, the number of lost packets for the service packets whose color belongs to the first color spectrum.

Figure 3C:
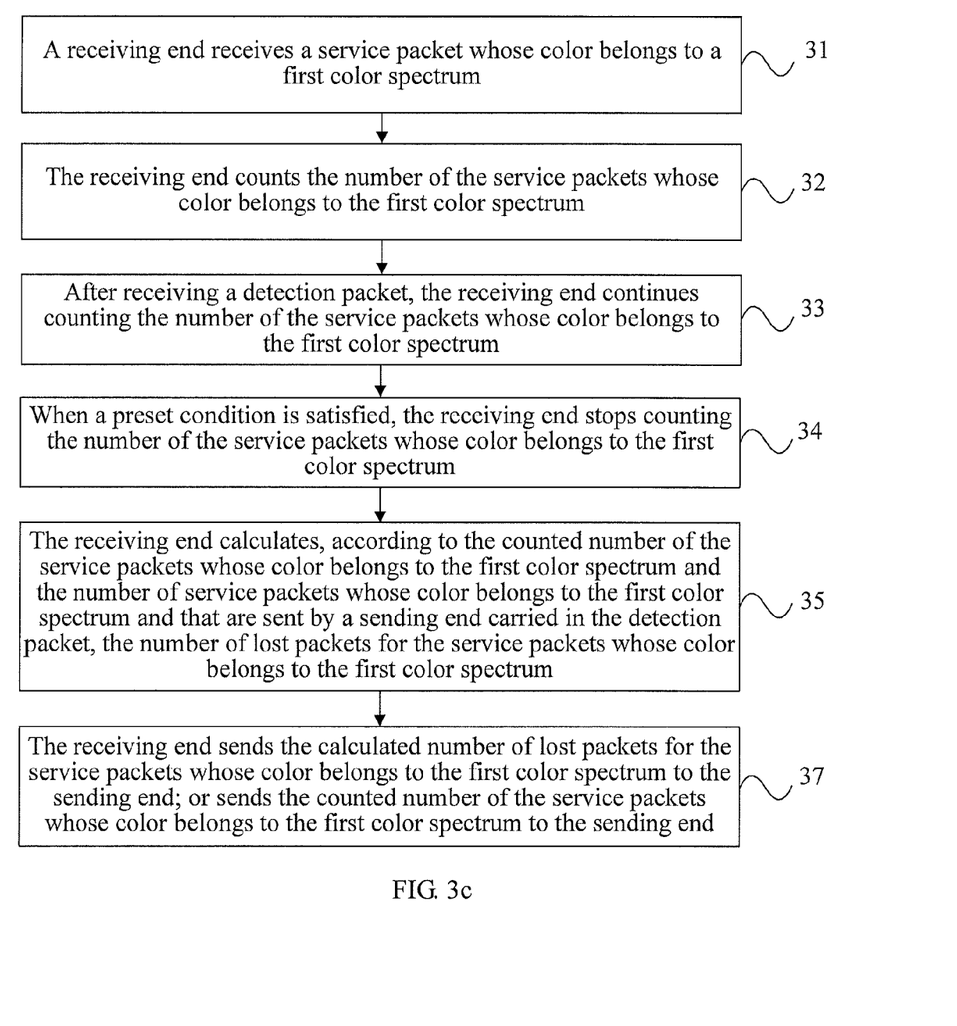
FIG. 3c is a schematic flow chart of a method according to another embodiment of the present application.

Optionally, as shown in FIG. 3c, after 35, this embodiment may further include:

37: The receiving end sends the calculated number of lost packets for the service packets whose color belongs to the first color spectrum to the sending end; or sends the counted number of the service packets whose color belongs to the first color spectrum to the sending end, so that the sending end calculates, according to the counted number of the service packets whose color belongs to the first color spectrum and the number of the service packets whose color belongs to the first color spectrum and that are sent by the sending end, the number of lost packets for the service packets whose color belongs to the first color spectrum.

Optionally, the foregoing preset condition is satisfied, which may be that a timer times out, or the counted number of packets is the same as the number of packets that is carried in the detection packet.

In this embodiment, the number of lost packets is not calculated after a detection packet is received and according to the number of service packets received before the detection packet, and instead, a certain condition is preset, and before the preset condition is satisfied, the number of received service packets continues to be counted. Therefore, in the embodiment of the present application, during calculation of the number of lost packets, as many service packets as possible sent by a sending end within one sending detection period are taken into consideration, and the calculated number of lost packets is also more accurate.

Figure 4:
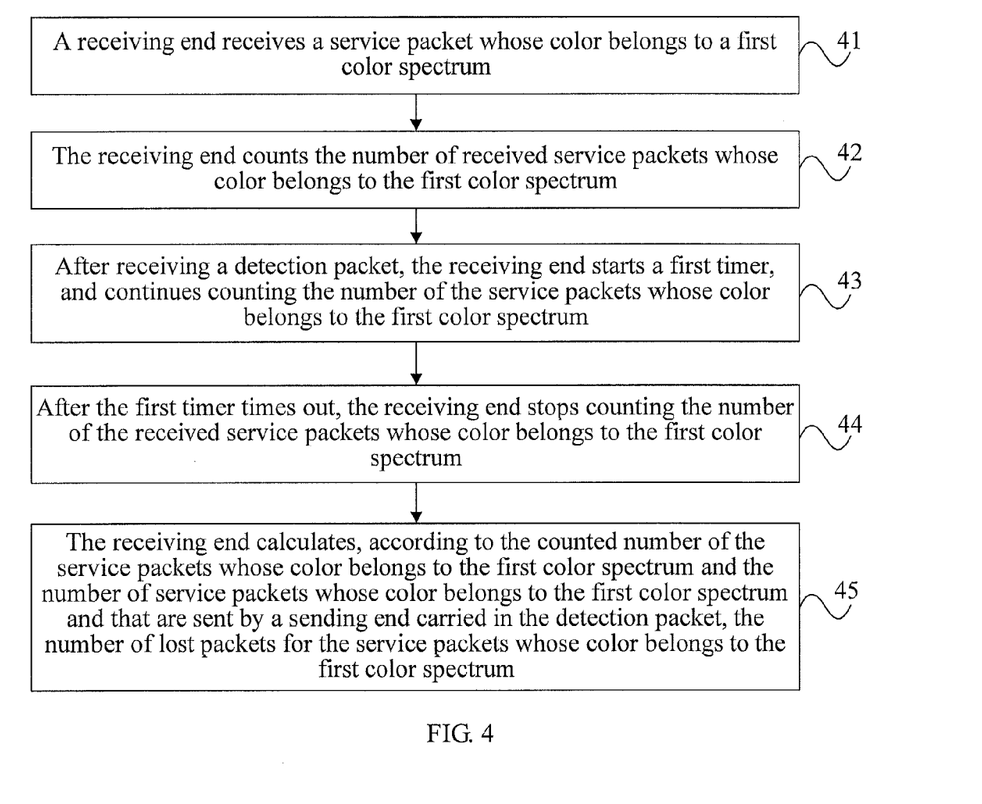
FIG. 4 is a schematic flow chart of a method according to another embodiment of the present application.

FIG. 4 is a schematic flow chart of a method according to another embodiment of the present application, where the method includes:

41: A receiving end receives a service packet whose color belongs to a first color spectrum.

42: The receiving end counts the number of the received service packets whose color belongs to the first color spectrum.

43: After receiving a detection packet, the receiving end starts a first timer, and continues counting the number of the service packets whose color belongs to the first color spectrum. The detection packet carries the number of service packets whose color belongs to the first color spectrum and that are sent by a sending end. Optionally, the number of the service packets whose color belongs to the first color spectrum and that are sent by the sending end carried in the foregoing detection packet may be the number of service packets whose color belongs to the first color spectrum and that are sent by the sending end within one sending detection period, and may also be the accumulated number of service packets whose color belongs to the first color spectrum and that are sent by the sending end within multiple sending detection periods.

44: After the first timer times out, the receiving end stops counting the number of the received service packets whose color belongs to the first color spectrum.

45: The receiving end calculates, according to the counted number of the service packets whose color belongs to the first color spectrum and the number of service packets whose color belongs to the first color spectrum and that are sent by the sending end carried in the detection packet, the number of lost packets for the service packets whose color belongs to the first color spectrum.

When the receiving end receives the detection packet, it indicates that one receiving detection period ends. A service packet sent by the sending end within one sending detection period may not be transmitted to the receiving end within a corresponding receiving detection period in a transmission process for various reasons. In the embodiment of the present application, after receiving a detection packet, a receiving end does not stop counting the number of received service packets, but starts a timer, and before the timer times out, continues counting the number of the received service packets. Therefore, in the embodiment of the present application, during calculation of the number of lost packets, as many service packets as possible sent by a sending end within one sending detection period are taken into consideration, and the calculated number of lost packets is also more accurate.

Optionally, time of the timer may be a maximum delay value from the sending end to the receiving end. Definitely, the time of the timer may also be another value, for example, any numerical value that does not exceed half of a corresponding sending detection period.

Optionally, the receiving end calculates, according to the counted number of the service packets whose color belongs to the first color spectrum and the number of service packets whose color belongs to the first color spectrum and that are sent by the sending end carried in the detection packet, the number of lost packets for the service packets whose color belongs to the first color spectrum, which specifically is: The receiving end subtracts the counted number of the service packets whose color belongs to the first color spectrum from the number of the service packets whose color belongs to the first color spectrum and that are sent by the sending end carried in the detection packet to obtain the number of lost packets for the service packets whose color belongs to the first color spectrum.

Optionally, the receiving end counts the number of the received service packets whose color belongs to the first color spectrum, which specifically is: The receiving end starts a counter to count the number of the received service packets whose color belongs to the first color spectrum. Further optionally, the counted number of the service packets whose color belongs to the first color spectrum may be a count value of the last count, and may also be an accumulated count value of multiple counts.

Optionally, being similar to the embodiment shown in FIG. 3*b*, after 44, the method may further include (not shown in FIG. 4):

46: The receiving end sends a response packet to the sending end to respond to the foregoing detection packet, where the response packet carries the counted number of the service packets whose color belongs to the first color spectrum.

When receiving the foregoing response packet, the sending end can calculate, according to the counted number of the service packets whose color belongs to the first color spectrum carried in the response packet and the number of the service packets whose color belongs to the first color spectrum and that are sent by the sending end, the number of lost packets for the service packets whose color belongs to the first color spectrum.

Optionally, being similar to the embodiment shown in FIG. 3*c*, after 45, this embodiment may further include (not shown in FIG. 4):

47: The receiving end sends the calculated number of lost packets for the service packets whose color belongs to the first color spectrum to the sending end; or sends the counted number of the service packets whose color belongs to the first color spectrum to the sending end, so that the sending end calculates, according to the counted number of the service packets whose color belongs to the first color spectrum and the number of the service packets whose color belongs to the first color spectrum and that are sent by the sending end, the number of lost packets for the service packets whose color belongs to the first color spectrum.

In this embodiment, the number of lost packets is not calculated after a detection packet is received and according to the number of service packets received before the detection packet, and instead, a timer is started, and before the timer times out, the number of received service packets continues to be counted. Therefore, during calculation of the number of lost packets, as many service packets as possible sent by a sending end within one sending detection period are taken into consideration, and the calculated number of lost packets is also more accurate.

Figure 5:
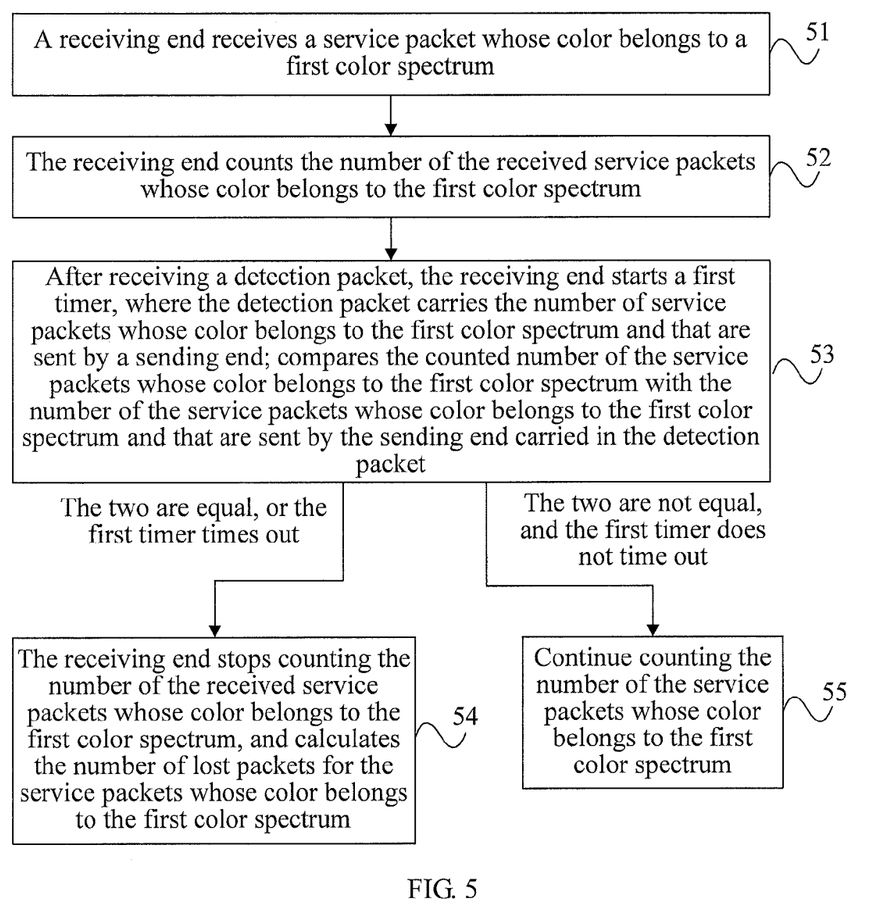
FIG. 5 is a schematic flow chart of a method according to another embodiment of the present application.

FIG. 5 is a schematic flow chart of a method according to another embodiment of the present application, where the method includes:

51: A receiving end receives a service packet whose color belongs to a first color spectrum.

52: The receiving end counts the number of the received service packets whose color belongs to the first color spectrum.

53: After receiving a detection packet, the receiving end starts a first timer, where the detection packet carries the number of service packets whose color belongs to the first color spectrum and that are sent by a sending end; compares the counted number of the service packets whose color belongs to the first color spectrum with the number of the service packets whose color belongs to the first color spectrum and that are sent by the sending end carried in the detection packet; and when the two are equal, or when the first timer times out, perform 54; and otherwise, perform 55.

54: The receiving end stops counting the number of the received service packets whose color belongs to the first color spectrum, and calculates, according to the counted number of the service packets whose color belongs to the first color spectrum and the number of service packets whose color belongs to the first color spectrum and that are sent by the sending end carried in the detection packet, the number of lost packets for the service packets whose color belongs to the first color spectrum.

55: Continue counting the number of the service packets whose color belongs to the first color spectrum.

Compared with the previous embodiment, in this embodiment, after receiving a detection packet, a receiving end not only starts a timer, but also compares the number of service packets whose color belongs to a first color spectrum and that are sent by a sending end carried in the detection packet with the number of service packets whose color belongs to the first color spectrum counted by a receiving end. If the two are equal, it means that all service packets whose color belongs to the first color spectrum and that are sent by the sending end have already been received by the receiving end. At this time, no matter whether the timer times out, the counting is stopped. Therefore, at the same time when the number of lost packets can be accurately calculated, processing performance of a device can be improved.

Figure 6A:
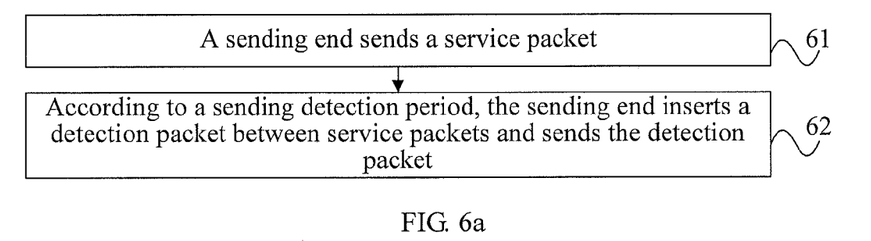
FIG. 6a is a schematic flow chart of a method according to another embodiment of the present application.

FIG. 6a is a schematic flow chart of a method according to another embodiment of the present application, where the method includes:

61: A sending end sends a service packet, where the service packet carries information indicating a color, colors of service packets sent within a same sending detection period belong to a same color spectrum, and color spectrums of service packets sent within adjacent sending detection periods have no intersection.

Optionally, before 61, the sending end may perform coloring processing on the service packet. Definitely, in another optional solution, the sending end may receive a colored packet from another device. Further optionally, the information indicating a color may be carried in an EXP field of an entropy label, a VLAN ID, 802.1P or a sequence number of a PW control word. By taking the EXP field as an example, different values represent different colors, for example, "1" represents a color and "2" represents another color.

62: According to a sending detection period, the sending end inserts a detection packet between service packets and sends the detection packet, where the foregoing detection packet carries the number of sent packets.

For example, two color spectrums may be adopted to alternately color service packets sent in adjacent sending detection periods. Alternatively, multiple (for example: three) color spectrums may be adopted to color service packets in adjacent sending detection periods.

Optionally, the foregoing sending detection period may be fixed. For example, one detection packet is inserted at every time interval of T. Alternatively, the sending detection period may not be fixed. For example, the sending detection period may be a cycle of 1 second, 2 seconds, and 3 seconds in sequence. Optionally, the foregoing sending detection period may be agreed by the sending end and a receiving end in advance. Alternatively, a receiving end may not know the sending detection period in advance. For example, a detection packet carries time of sending a next detection packet.

Optionally, the number of the sent packets that is carried in the foregoing detection packet may be a count value within one sending detection period, and may also be an accumulated count value within multiple sending detection periods.

Figure 6B:
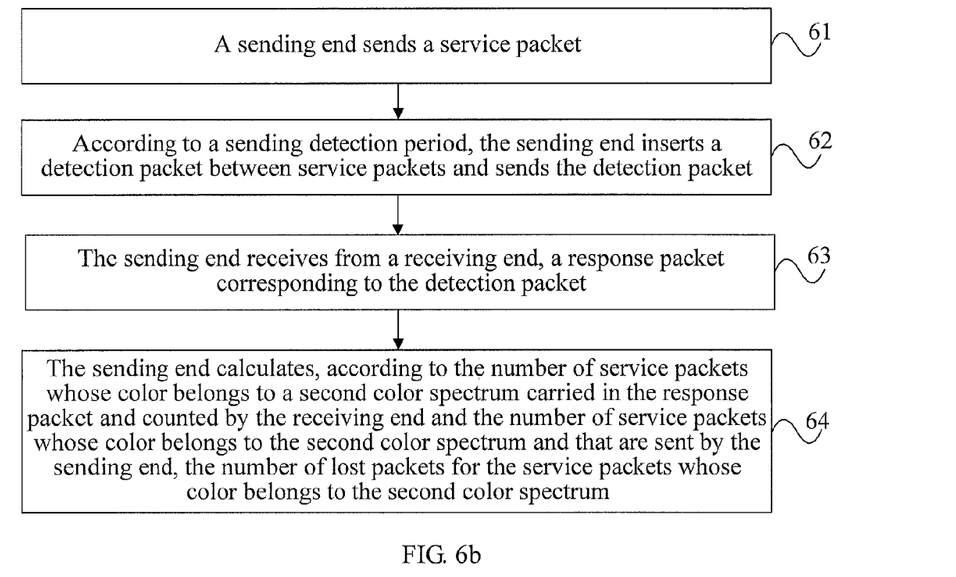
FIG. 6b is a schematic flow chart of a method according to another embodiment of the present application.

Optionally, as shown in FIG. 6b, this embodiment may further include:

63: The sending end receives, from the receiving end, a response packet corresponding to the detection packet, where the response packet carries the number of service packets whose color belongs to a second color spectrum counted by the receiving end.

64: The sending end calculates, according to the number of the service packets whose color belongs to the second color spectrum carried in the response packet and counted by the receiving end and the number of service packets whose color belongs to the second color spectrum and that are sent by the sending end, the number of lost packets for the service packets whose color belongs to the second color spectrum.

Figure 6C:
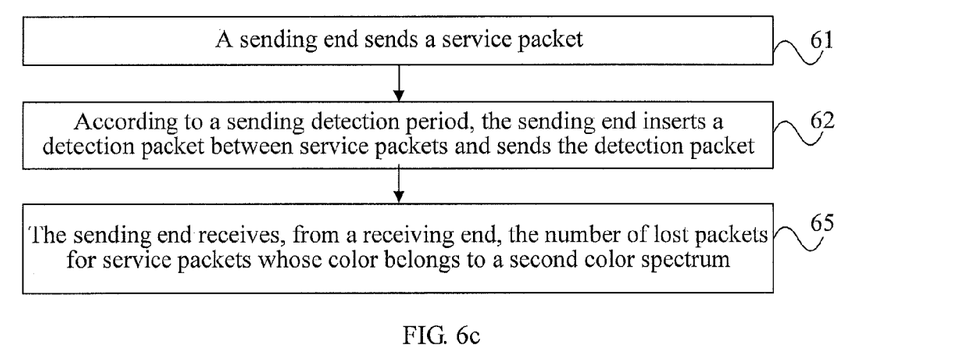
FIG. 6c is a schematic flow chart of a method according to another embodiment of the present application.

Optionally, as shown in FIG. 6c, this embodiment may further include:

65: The sending end receives, from the receiving end, the number of lost packets for the service packets whose color belongs to the second color spectrum.

In this embodiment, during calculation of the number of lost packets, different color spectrums are adopted to distinguish service packets within different sending detection periods, so that during counting, a receiving end may determine, by color, service packets in a sending detection period that need to be counted, so as to obtain an accurate count value, thereby improving the accuracy of a packet loss test.

Figure 7:
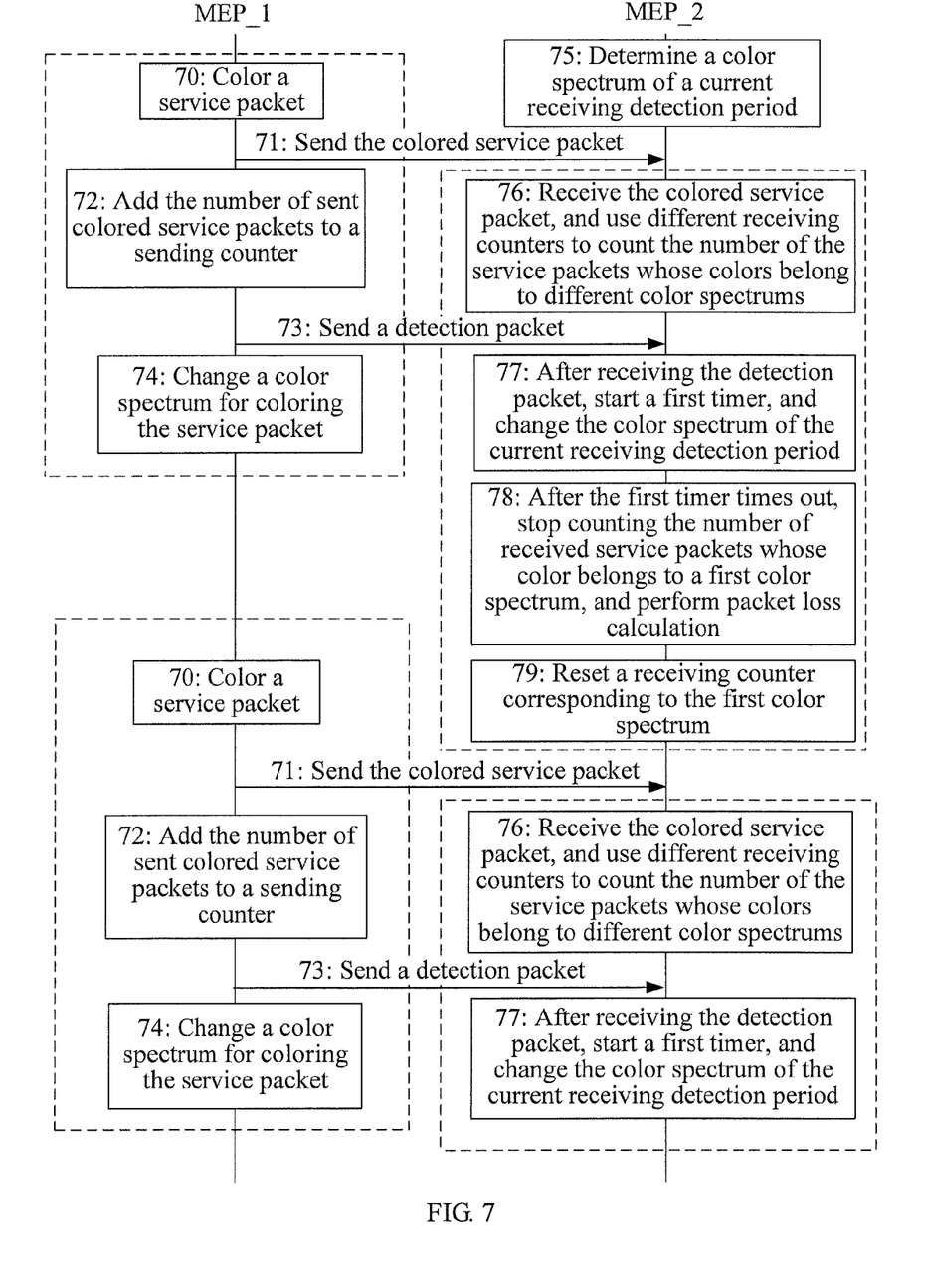
FIG. 7 is a schematic flow chart of a method according to another embodiment of the present application.

The following takes the scenario shown in FIG. 2 as an example to introduce the embodiment of the present application in detail. As shown in FIG. 7, the method includes:

70: MEP_1 colors a service packet.

In this embodiment, that information indicating a color is carried by adopting an EXP field of an entropy label is taken as an example. For example, an EXP field of a service packet within a current sending detection period carries a value representing a color, for example, "2" represents red, and "1" represents green.

71: Send the colored service packet.

72: MEP_1 adds the number of sent colored service packets to a sending counter.

Specifically, two counting manners may exist. One is that: Separate counting is adopted, that is, separate counting is performed for each sending detection period, and at this time, after a detection packet is sent, a value of the sending counter starts counting from 0. The other is accumulative counting, that is, a count value of the counter is not reset, and instead, the number of service packets sent within each sending detection period is accumulatively counted starting from initial zero.

After that, as long as a preset detection period timer does not time out, 71 and 72 may be performed repeatedly until the detection period timer times out.

73: When a preset sending detection period timer times out, MEP_1 inserts a detection packet between service packets and sends the detection packet, where the detection packet carries a count value of the sending counter.

The detection packet may be in multiple forms, for example, may adopt a continuity check (Continuity Check, CC) packet, a loss measurement message (Loss Measurement Message, LMM) packet or a loss measurement response (Loss Measurement Response, LMR) packet.

In addition, the detection packet may be colored or not be colored, and the colored detection packet may have a same color as a service packet within a previous sending detection period, or may have a same color as a service packet within a next sending detection period.

74: MEP_1 changes a color spectrum for coloring the service packet.

For example, if a color that belongs to a first color spectrum is adopted to color the service packet before, later a color that belongs to a second color spectrum is adopted to color the service packet.

After that, MEP_1 may repeat 70-74.

75: MEP_2 determines a color spectrum of a current receiving detection period.

Optionally, the color spectrum of the current receiving detection period may be determined according to a previous agreement of a sending end and a receiving end; or the color spectrum of the current receiving detection period may be determined according to a color of a received colored service packet.

76: MEP_2 receives the colored service packet, and uses different receiving counters to count the numbers of service packets whose colors belong to different color spectrums.

Optionally, a one-to-one correspondence may exist between a receiving counter and a color spectrum. For example, it is assumed two color spectrums of service packets exist, and two receiving counters are set, which correspond to a service packet whose color belongs to a first color spectrum and a service packet whose color belongs to a second color spectrum, respectively; and the two counters count service packets of the two color spectrums, respectively.

Optionally, a one-to-many correspondence may exist between one receiving counter and multiple color spectrums. For example, if three color spectrums of service packets exist, a first counter may be adopted to count a service packet whose color belongs to a first color spectrum, a second counter may be adopted to count a service packet whose color belongs to a second color spectrum, and then the first counter may be adopted to count a service packet whose color belongs to a third color spectrum. Preferably, in this case, it is only required that service packets of adjacent color spectrums are counted by different counters.

In this scenario, it is assumed that the color spectrum of the current receiving detection period is a first color spectrum.

77: After receiving the detection packet, MEP_2 starts a first timer, and changes the color spectrum of the current receiving detection period.

For example, before the detection packet is received, the color spectrum of the current receiving detection period is a first color spectrum, and after the detection packet is received, the color spectrum of the current receiving detection period is changed to a second color spectrum. In this scenario, the first color spectrum refers to a color spectrum of the current receiving detection period before the changing, and the second color spectrum refers to a color spectrum of the current receiving detection period after the changing.

Preferably, timeout time of the first timer may be maximum delay time of transmitting a packet from MEP_1 to MEP_2. It may be understood that if no service packet is lost, when the timer times out, service packets sent by the sending end should all be transmitted to the receiving end.

78: After the foregoing first timer times out, MEP_2 stops counting the number of the received service packets whose color belongs to the first color spectrum, and performs packet loss calculation.

79: MEP_2 resets a receiving counter corresponding to the first color spectrum.

After that, MEP_2 may repeat 76-79. Due to a space limitation, FIG. 7 shows only a part of a procedure that MEP_2 repeats 76-79 for the second time.

It should be noted that, the first color spectrum and the second color spectrum only differ in naming, and represent the color spectrum of the current receiving detection period before the changing and the color spectrum of the current receiving detection period after the changing, respectively, and colors represented by them are not fixed.

For example, it is assumed that an initially determined color spectrum of the current receiving detection period is red, after the detection packet is received, the color spectrum of the current receiving detection period is changed to green, and after the number of lost packets for red service packets has been calculated, a receiving counter corresponding to red is reset and enters a next cycle. In the next cycle, the color spectrum of the current receiving detection period is green, after the detection packet is received, the color spectrum of the current receiving detection period is changed to red, and after the number of lost packets for green service packets has been calculated, a receiving counter corresponding to green is reset and enters a next cycle, and this cycle repeats.

Optionally, in the embodiment of the present application, a second timer may further be set. After the second timer times out, if the receiving end still does not receive a detection packet, it may be considered that the detection packet is lost.

Optionally, in the embodiment of the present application, when the detection packet is colored and after MEP_2 receives the detection packet, whether the detection packet has been lost may be determined according to the color spectrum of the current receiving detection period and a color of the detection packet.

In this scenario, by adopting the technical solution provided in an embodiment of the present application, during calculation of the number of lost packets, as many service packets as possible sent by a sending end within one sending detection period can be taken into consideration, and the calculated number of lost packets is also more accurate.

Figure 8A:
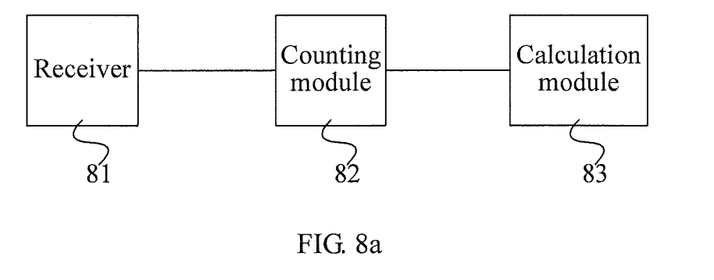
FIG. 8a is a schematic structural diagram of a receiving device according to an embodiment of the present application.

FIG. 8a is a schematic structural diagram of a receiving device according to an embodiment of the present application, where the receiving device includes a receiver 81, a counting module 82 and a calculation module 83.

The receiver 81 is configured to receive packets, which include a service packet whose color belongs to a first color spectrum and a detection packet.

The counting module 82 is configured to count the number of the service packets whose color belongs to the first color spectrum and that are received by the receiver 81, and when a preset condition is satisfied, stop counting the number of the service packets whose color belongs to the first color spectrum, where the detection packet carries the number of service packets whose color belongs to the first color spectrum and that are sent by a sending end.

The calculation module 83 is configured to calculate, according to the number of the service packets whose color belongs to the first color spectrum counted by the counting module 82 and the number of the service packets whose color belongs to the first color spectrum and that are sent by the sending end carried in the detection packet, the number of lost packets for the service packets whose color belongs to the first color spectrum.

Figure 8B:
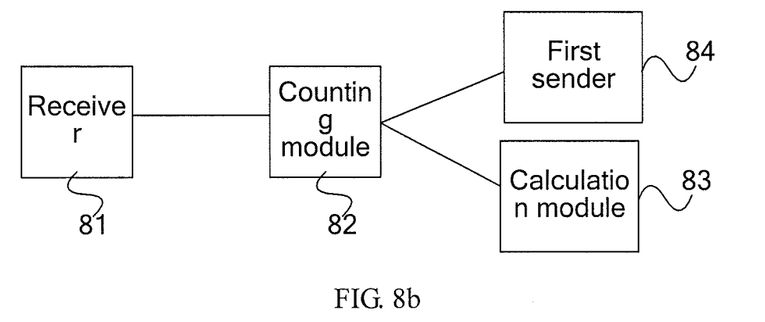
FIG. 8b is a schematic structural diagram of a receiving device according to another embodiment of the present application.

Optionally, referring to FIG. 8b, the device may further include:

a first sender 84, configured to send the number of the service packets whose color belongs to the first color spectrum counted by the counting module 82 to the sending end, so that the sending end calculates, according to the counted number of the service packets whose color belongs to the first color spectrum and the number of the service packets whose color belongs to the first color spectrum and that are sent by the sending end, the number of lost packets for the service packets whose color belongs to the first color spectrum.

Figure 8C:
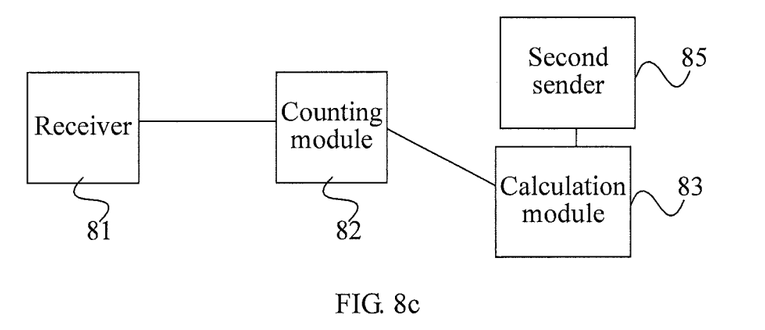
FIG. 8c is a schematic structural diagram of a receiving device according to another embodiment of the present application.

Optionally, referring to FIG. 8c, the device may further include:

a second sender 85, configured to send the number of lost packets for the service packets whose color belongs to the first color spectrum calculated by the calculation module 83 to the sending end.

Figure 8D:
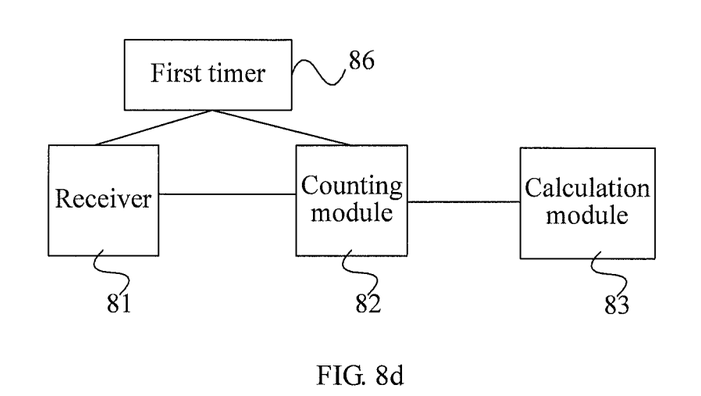
FIG. 8d is a schematic structural diagram of a receiving device according to another embodiment of the present application.

Optionally, referring to FIG. 8d, the device may further include:

a first timer 86, configured to start after the receiver 81 receives the detection packet, where after the first timer 86 times out, the counting module 82 stops counting the number of the received service packets whose color belongs to the first color spectrum.

Figure 8E:
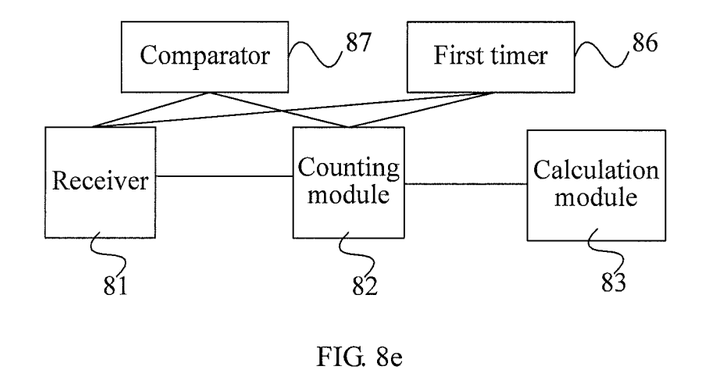
FIG. 8e is a schematic structural diagram of a receiving device according to another embodiment of the present application.

Optionally, referring to FIG. 8e, the device may further include:

a first timer 86, configured to start after the receiver 81 receives the detection packet; and a comparator 87, configured to compare the counted number of the service packets whose color belongs to the first color spectrum with the number of the service packets whose color belongs to the first color spectrum and that are sent by the sending end carried in the detection packet, where when the comparator 87 determines that the number of the service packets whose color belongs to the first color spectrum is equal to the number of the service packets whose color belongs to the first color spectrum and that are sent by the sending end carried in the detection packet, or when the first timer 86 times out, the counting module 82 stops counting the number of the service packets whose color belongs to the first color spectrum.

In this embodiment, the number of lost packets is not calculated after a detection packet is received and according to the number of service packets received before the detection packet, and instead, a certain condition is preset, and before the preset condition is satisfied, the number of received service packets continues to be counted. Therefore, in the embodiment of the present application, during calculation of the number of lost packets, as many service packets as possible sent by a sending end within one sending detection period are taken into consideration, and the calculated number of lost packets is also more accurate.

Figure 9A:
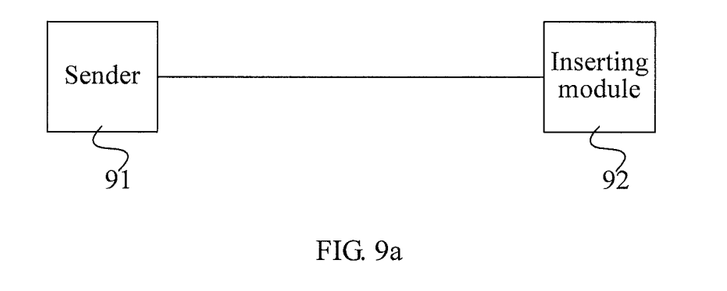
FIG. 9a is a schematic structural diagram of a sending device according to an embodiment of the present application.

FIG. 9a is a schematic structural diagram of a sending device according to an embodiment of the present application, where the sending device includes a sender 91 and an inserting module 92.

The sender 91 is configured to send a service packet, where the service packet carries information indicating a color, colors of service packets sent within a same sending detection period belong to a same color spectrum, and color spectrums of service packets sent within adjacent sending detection periods have no intersection.

The inserting module 92 is configured to insert a detection packet between service packets according to a sending detection period, where the detection packet carries the number of sent packets.

The sender 91 is further configured to send the detection packet.

Figure 9B:
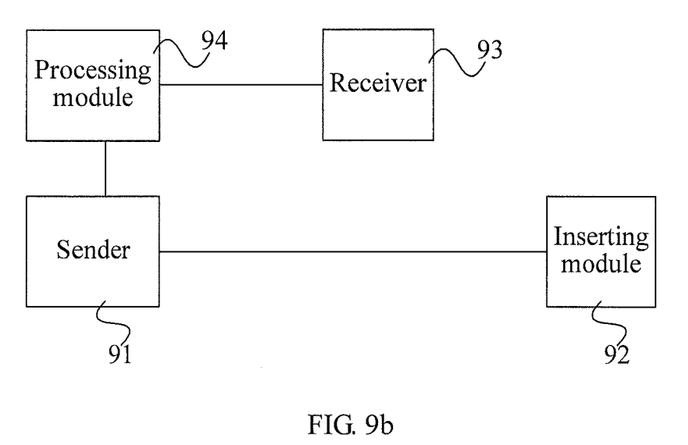
FIG. 9b is a schematic structural diagram of a sending device according to another embodiment of the present application.

Optionally, referring to FIG. 9b, the device may further include:

a receiver 93, configured to receive, from a receiving end, the number of lost packets for service packets whose color belongs to a second color spectrum; or receive, from a receiving end, a response packet corresponding to the detection packet, where the response packet carries the number of service packets whose color belongs to a second color spectrum counted by the receiving end; and a processing module 94, configured to calculate, according to the number of the service packets whose color belongs to the second color spectrum carried in the response packet and counted by the receiving end and the number of service packets whose color belongs to the second color spectrum and that are sent by a sending end, the number of lost packets for the service packets whose color belongs to the second color spectrum.

Optionally, the information indicating a color is carried in an EXP field of an entropy label of the service packet, a VLAN ID, 802.1P or a sequence number of a PW control word.

In this embodiment, during calculation of the number of lost packets, different color spectrums are adopted to distinguish service packets within different sending detection periods, so that during counting, a receiving end may determine, by color, service packets in a sending detection period that need to be counted, so as to obtain an accurate count value, thereby improving the accuracy of a packet loss test.

Figure 10:
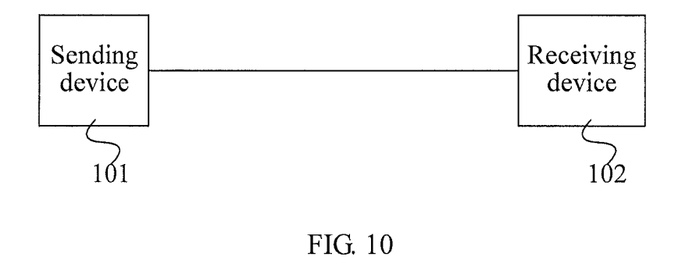
FIG. 10 is a schematic structural diagram of a packet loss detection system according to an embodiment of the present application.

FIG. 10 is a schematic structural diagram of a packet loss detection system according to an embodiment of the present application, where the system includes a sending device 101 and a receiving device 102, where for the sending device 101, reference may be made to FIG. 9a or FIG. 9b, and for the receiving device, reference may be made to any one of FIG. 8a to FIG. 8e.

In this embodiment, when a sending end calculates the number of lost packets, different color spectrums are adopted to distinguish service packets within different sending detection periods, so that during counting, a receiving end may determine, by color, service packets in a sending detection period that need to be counted, so as to obtain an accurate count value, thereby improving the accuracy of a packet loss test. The receiving end does not calculate the number of lost packets after receiving a detection packet and according to the number of service packets received before the detection packet, and instead, a certain condition is preset, and before the preset condition is satisfied, the number of received service packets continues to be counted. Therefore, in the embodiment of the present application, during calculation of the number of lost packets, as many service packets as possible sent by the sending end within one sending detection period are taken into consideration, and the calculated number of lost packets is also more accurate. It may be understood that, cross reference may be made to the related characteristics in the foregoing methods and devices. In addition, the "first" and "second" in the foregoing embodiments are used to distinguish the embodiments, but do not represent advantages and disadvantages of the embodiments.

Persons of ordinary skill in the art may understand that all or a part of the steps of the foregoing method embodiments may be implemented by a program instructing relevant hardware. The foregoing program may be stored in a computer readable storage medium. When the program is run, the steps of the foregoing method embodiments are performed. The foregoing storage medium may include any medium that is capable of storing program codes, such as a ROM, a RAM, a magnetic disk, or an optical disk.

Finally, it should be noted that the foregoing embodiments are merely intended for describing the technical solutions of the present application rather than limiting the present application. Although the present application is described in detail with reference to the foregoing embodiments, persons of ordinary skill in the art should understand that they may still make modifications to the technical solutions described in the foregoing embodiments, or make equivalent replacements to some technical features thereof; however, these modifications or replacements do not make the essence of corresponding technical solutions depart from the spirit and scope of the technical solutions in the embodiments of the present application.

What is claimed is:

1. A packet loss detection method, comprising:
receiving, by a receiving end, a service packet whose color belongs to a first color spectrum;
counting, by the receiving end, the number of the service packets whose color belongs to the first color spectrum;
after receiving a detection packet, continuing, by the receiving end, counting the number of the service packets whose color belongs to the first color spectrum, wherein the detection packet carries the number of service packets whose color belongs to the first color spectrum and that are sent by a sending end;
when a preset condition is satisfied, stopping, by the receiving end, counting the number of the service packets whose color belongs to the first color spectrum, wherein the number of the service packets whose color belongs to the first color spectrum counted by the receiving end and the number of the service packets whose color belongs to the first color spectrum and that are sent by the sending end carried in the detection packet are used for calculating the number of lost packets; and calculating, by the receiving end, according to the counted number of the service packets whose color belongs to the first color spectrum and the number of the service packets whose color belongs to the first color spectrum and that are sent by the sending end carried in the detection packet, the number of lost packets for the service packets whose color belongs to the first color spectrum.

2. The method according to claim 1, wherein after the stopping, by the receiving end, counting the number of the service packets whose color belongs to the first color spectrum, the method further comprises:

sending, by the receiving end, the counted number of the service packets whose color belongs to the first color spectrum to the sending end, so that the sending end calculates, according to the counted number of the service packets whose color belongs to the first color spectrum and the number of the service packets whose color belongs to the first color spectrum and that are sent by the sending end, the number of lost packets for the service packets whose color belongs to the first color spectrum.

3. The method according to claim 1, wherein after the calculating the number of lost packets for the service packets whose color belongs to the first color spectrum, the method further comprises at least one of the following:

sending, by the receiving end, the calculated number of lost packets for the service packets whose color belongs to the first color spectrum to the sending end; and sending the counted number of the service packets whose color belongs to the first color spectrum to the sending end.

4. The method according to claim 1, wherein after the receiving, by the receiving end, a detection packet, the method further comprises: starting, by the receiving end, a first timer; and when the preset condition is satisfied, the stopping, by the receiving end, counting the number of the service packets whose color belongs to the first color spectrum comprises: after the first timer times out, stopping, by the receiving end, counting the number of the received service packets whose color belongs to the first color spectrum.

5. The method according to claim 1, wherein after the receiving, by the receiving end, a detection packet, the method further comprises: starting, by the receiving end, a first timer; and comparing the counted number of the service packets whose color belongs to the first color spectrum with the number of the service packets whose color belongs to the first color spectrum and that are sent by the sending end carried in the detection packet; and when the preset condition is satisfied, the stopping, by the receiving end, counting the number of the service packets whose color belongs to the first color spectrum comprises: when the number of the service packets whose color belongs to the first color spectrum is equal to the number of the service packets whose color belongs to the first color spectrum and that are sent by the sending end carried in the detection packet, or when the first timer times out, stopping, by the receiving end, counting the number of the service packets whose color belongs to the first color spectrum.

6. A sending device, comprising:

a sender, configured to send a service packet, wherein the service packet carries information indicating a color, colors of service packets sent within a same sending detection period belong to a same color spectrum, and color spectrums of service packets sent within adjacent sending detection periods have no intersection; and an inserting module, configured to insert a detection packet between service packets according to a sending detection period, wherein the detection packet carries the number of sent packets, wherein the sender is further configured to send the detection packet.

7. The device according to claim 6, further comprising:

a receiver, configured to receive, from a receiving end, the number of lost packets for service packets whose color belongs to a second color spectrum, or receive, from a receiving end, a response packet corresponding to the detection packet, wherein the response packet carries the number of service packets whose color belongs to a second color spectrum counted by the receiving end; and a processing module, configured to calculate, according to the number of the service packets whose color belongs to the second color spectrum carried in the response packet and counted by the receiving end and the number of service packets whose color belongs to the second color spectrum and that are sent by a sending end, the number of lost packets for the service packets whose color belongs to the second color spectrum.

8. A packet loss detection system, comprising:

a receiving device comprising:

a receiver, configured to receive packets, which comprise a service packet whose color belongs to a first color spectrum and a detection packet;

a counting module, configured to count the number of the service packets whose color belongs to the first color spectrum and that are received by the receiver, and when a preset condition is satisfied, stop counting the number of the service packets whose color belongs to the first color spectrum, wherein the detection packet carries the number of service packets whose color belongs to the first color spectrum and that are sent by a sending end; and a calculation module, configured to calculate, according to the number of the service packets whose color belongs to the first color spectrum counted by the counting module and the number of the service packets whose color belongs to the first color spectrum and that are sent by the sending end carried in the detection packet, the number of lost packets for the service packets whose color belongs to the first color spectrum;

a sending device comprising:

a sender, configured to send a service packet, wherein the service packet carries information indicating a color, colors of service packets sent within a same sending detection period belong to a same color spectrum, and color spectrums of service packets sent within adjacent sending detection periods have no intersection; and an inserting module, configured to insert a detection packet between service packets according to a sending detection period, wherein the detection packet carries the number of sent packets, wherein the sender is further configured to send the detection packet.

* * * * *